June 7, 1966     H. KUNZE ETAL     3,255,233
METHOD FOR SEPARATING AMMONIA FROM MIXTURES OF
GASES FROM ACRYLONITRILE SYNTHESIS
Filed May 17, 1962
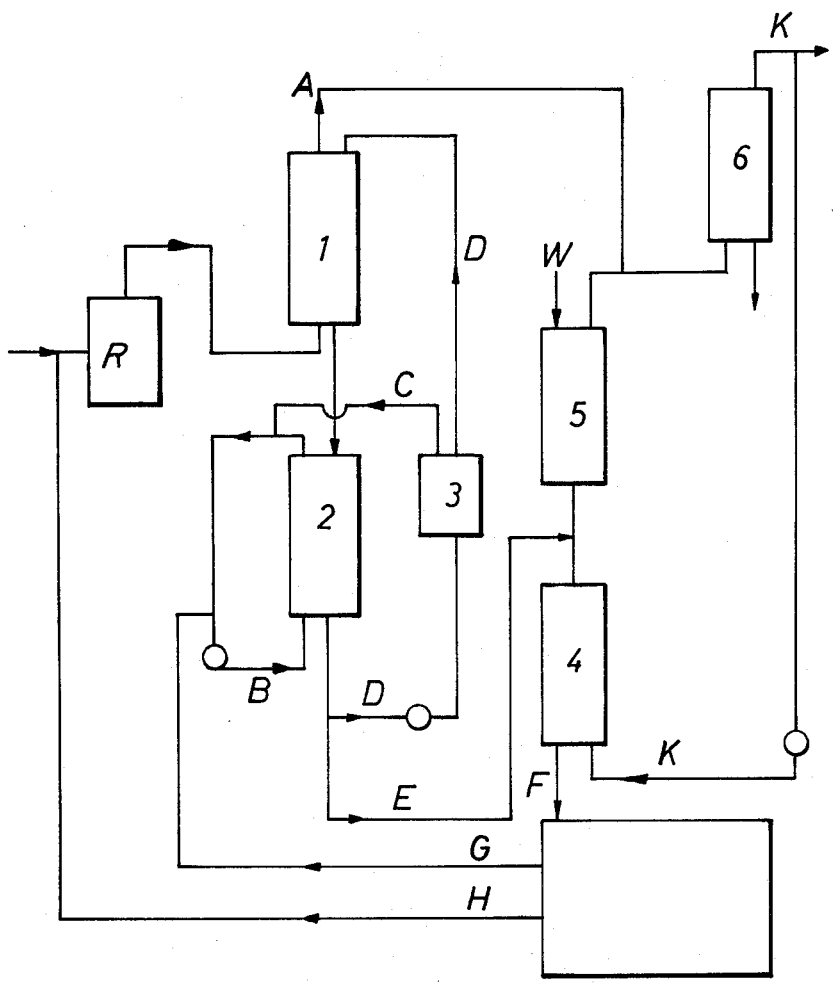
INVENTORS:
HEINRICH KUNZE, ARNOLD HAUSWEILER, KLAUS SCHWARZER.
BY
their ATTORNEYS

United States Patent Office 3,255,233
Patented June 7, 1966

3,255,233
METHOD FOR SEPARATING AMMONIA FROM MIXTURES OF GASES FROM ACRYLONITRILE SYNTHESIS
Heinrich Kunze, Cologne-Stammheim, and Arnold Hausweiler and Klaus Schwarzer, Cologne-Flittard, Germany, assignors to Farbenfabriken Bayer Aktiengesellschaft, Leverkusen, Germany, a German corporation
Filed May 17, 1962, Ser. No. 195,480
Claims priority, application Germany, May 19, 1961, F 33,961
3 Claims. (Cl. 260—465.3)

This invention relates to a novel process for the removal of ammonia contained in gases.

In many chemical processes, mixtures of gases are formed which contain ammonia in addition to other compounds. The ammonia must be separated from these gaseous mixtures, for example from coking plant gases, from the reaction gases resulting from Andrussow's hydrocyanic acid process or from the reaction gases produced during the synthesis of acrylonitrile, and must be recovered, if possible, in their pure state or reintroduced into the process.

This separation of ammonia may be effected, for example, by washing the gas mixtures with sulphuric acid and converting the ammonia into ammonium sulphate. It has already been proposed to effect the recovery of ammonia by means of the thermal decomposition of ammonium sulphate into ammonia and ammonium bisulphate. However, this process has not yet been satisfactorily applied on a commercial scale because the corrosion of the structural material occurring at temperatures above 300° C which are necessary for the separation, presents considerable difficulties. In addition, the strong sublimation of the ammonium bisulphate is a disturbing factor. Finally, the separation process fails completely where ammonium sulphate is used which contains even traces only of organic compounds.

Another method for separating ammonia is based on reacting ammonia with an aqueous solution of a complex compound of boric acid and an organic polyhydroxy compound.

From these solutions, the ammonia may again be removed at elevated temperatures. However, this method has the following considerable drawbacks:

Owing to the solubility ratios of the ammonium salts formed, the solution may absorb only about 1 percent by weight ammonia. Furthermore, water-soluble, difficultly volatile compounds may accumulate in the absorption solution and may finally stop the process. An economically utilizable method for purifying this expensive absorption solution has not yet been found.

Separation of ammonia from gas mixtures may furthermore be effected by forming complex compounds with salts of the metals Cu, Co, Ni, Zn and Cd. This process also has the disadvantage that impurities may accumulate in the solutions and may necessitate expensive regeneration. Moreover, the gas mixture must not contain compounds which might displace the ammonia from the complex compound, such as, for example, hydrogen cyanide.

It is an object of the present invention to provide a new method for the removal of ammonia from gases. A further object is to avoid the aforementioned disadvantages. Still more objects will appear hereinafter.

It has now been found that ammonia may be separated advantageously from gas mixtures, if the gas mixture is washed with an aqueous absorption solution of ammonium carbonates, saturated with free carbon dioxide at temperatures which are below the range at which the carbon-dioxide-ammonia compounds decomposed, so that the ammonia is combined with carbon dioxide, and by separating subsequently, from a part of the circulating absorption liquid, if desired after prior separation of other dissolved constitutents of the gas mixture to be treated, the carbon dioxide and ammonia by means known to the art, for example, by thermal separation and distillation. The method according to the invention makes possible the separation of ammonia from reaction gases and its recovery in a process, which is free of the disadvantages mentioned above, which operates with the lowest possible energy consumption and which recovers the ammonia at an economical price.

The individual steps of the process according to the invention will be explained with reference to the accompanying diagrammatic drawing shown in FIG. 1, and by the description of a specific embodiment which follows.

The ammoniacal reaction gases coming from the reactor R are usually cooled, for example to a temperature of 30–40° C. and are conducted through a washing column 1 from the bottom towards the top, either under atmospheric or elevated pressure, where they are scrubbed by a solution of ammonium bicarbonate, or a mixture of ammonium carbonate, ammonium bicarbonate and carbon dioxide. The temperature of the solution should be below the temperature range of the carbon dioxide-ammonium compounds, and preferably below 30° C., for example between 15 and 25° C. During this process, the ammonia is removed from the countercurrent of reaction gas and converted into ammonium carbonate. Finally, also a smal proportion of the other products contained in the gas is dissolved, provided that these are soluble in water. The ammonia-free gas issues from the coulmn 1 and may be conducted by a duct A to a further processing stage, for example a scrubbing column 6.

The ammonium carbonate solution issuing from the sump of the washing column 1 containing possibly a little free ammonia and dissolved products, is now treated in a second column 2 at normal or higher pressure with gaseous carbon dioxide, which is supplied through the duct B. Any free ammonia present is thus combined with the carbon dioxide and the ammonium carbonate is converted wholly or partly into ammonium bicarbonate. From the solution issuing from the sump of the column 2 a part is taken off for further processing, whilst the remainder is again conducted through a duct D to the washing column 1, if desired through a degassing apparatus 3, where excess carbon dioxide is removed, which is carried away through a duct C. If the reduction in the volume, caused by taking off a part of the circulating liquid is not equalized by returning it after the elimination of ammonia or within the column 1 by the water content of the gas to be treated, fresh water is added in suitable amounts at the head of the column 1.

The ratio between washing liquid and gas volume, and with this the quantity of circulating washing liquid, necessary for the complete removal of the ammonia, depends substantially on the ammonia content of the reaction gases on the concentration of the ammonium salts in the solution and on the construction of the apparatus, and may be easily determined by tests.

The concentration of ammonium carbonates in the washing liquid may be regulated through the amount removed from the circulation for further processing. With too high a concentration of ammonium salts, combination of ammonia may be inhibited. Generally, good results are obtained with concentrations up to 10 percent by weight of carbonates, based on ammonium bicarbonate, that is to say, the gas mixture issuing from the head of the column 1 contains less than 0.01 percent by volume ammonia. In some cases, higher concentration, for example, up to 20 percent by weight, may be possible. The maximum permissible concentration may be easily determined for any process as a function of temperature and the quantity of solution circulating in the system.

From the washing liquid removed for further processing liquid carbon dioxide and ammonia are expelled and isolated by thermal separation of the ammonium carbonates and distillation, as known to the art (see: Ullmann, Enzyklopädie der technischen Chemie, 3rd edition, volume 3, pp. 529–537). Where the washing liquid has also dissolved other products from the reaction gas, in addition to ammonia, these are conviently removed before the recovery of ammonia and carbon dioxide from the solution.

The method described hereinafter for separating valuable reaction products (such as acrylonitrile) from aqueous solutions of ammonia-carbon doxide compounds is based on the following assumptions:

(1) At sufficiently low temperature, the ammonia-carbon dioxide compounds are so stable that the vapour pressure of the constituents is substantially lower than that of the other reaction products to be recovered.

(2) The water-solubility of free ammonia which may be formed by very slight decomposition of the ammonia-carbon dioxide compound, is much higher than the water-solubility of the other reaction products.

It has now been found that the valuable reaction products may be expelled by means of the following method:

The aqueous solution, containing ammonia-carbon dioxide compounds and other reaction products (such as acrylonitrile and hydrocyanic acid) flows through a duct E at a temperature of, say, 30–40° C. to the head of an exchange column 4, through which flows an inert gas in counter-current to the liquid heated to 30–40° C.

The gas desorbs from the solution the valuable reaction products contained therein, and corresponding to the lower partial ammonia pressure of the solution, a comparatively small amount of free ammonia. The gas then flows into the column 5, arranged above column 4 which receives amounts of fresh water W, which are comparatively small compared with the supply of column 4, and in which, due to the higher water-solubility of ammonia, mainly ammonia is absorbed from the inert gas, whilst the other products, together with the inert gas, leave the upper end of the column 5 in a substantially ammonia-free condition, and are conducted to a further processing stage, if desired together with the gas mixture leaving the column 1. The sump discharge from column 5 is mixed with the charge of column 4 from the sump of which there is discharged an aqueous solution of ammonia-carbon dioxide compounds through a duct F, from which ammonia and carbon dioxide are recovered as gases by known methods. The carbon dioxide which is recovered may be supplied through a duct G to column 2 and the gaseous ammonia through a duct H to a further processing stage. The remaining water, which may contain traces of high boiling-point waste impurities, is either reintroduced into the circulating absorption liquid or thrown away; it may also be processed in a waste water purification plant.

The inert gas required for operating the desorption column 4 may be taken from the waste gas current, from which the reaction products have been removed, for example downstream of the scrubbing column 6, and is introduced into the circuit through a duct K.

A particular advantage of the method of the invention is the complete or substantially complete inhibition of undesirable side reactions between ammonia and other products, for example, hydrocyanic acid or acrylonitrile, which may be very fast in an aqueous solution.

The process according to the invention therefore consists in the separation of ammonia from reaction gases which may contain water-soluble reaction products, and its recovery, characterized by the following stages, namely, a first stage, in which, at low temperatures, the ammonia is combined and possibly a part of the other products dissolved by means of a solution of ammonium carbonates, which is continuously regenerated; this stage may be followed by a second stage, in which the scrubbing liquid may be freed from dissolved products, with the exception of ammonia and carbon dioxide, at a slightly raised temperature; and a third known stage, in which the ammonia and carbon dioxide are expelled at higher temperatures.

*Example 1*

During the production of acrylonitrile from propylene and ammonia by reaction in the gas phase at elevated temperature using oxidation catalysts, a reaction gas with the following composition (in percent by volume) is formed:

45% Water vapor
2–3% Acrylonitrile
1–2% Hydrocyanic acid
1–2% Ammonia
1–2% Carbon dioxide The remainder consists of nitrogen, oxygen, hydrocarbons and carbon monoxide.

Prior to the isolation of the reaction products that is acrylonitrile and hydrocyanic acid, from this gas mixture, the ammonia must be removed in a water scrubber, because otherwise the secondary reaction between these products and ammonia would affect the yield.

About 25 standard cubic meters of this reaction gas at normal pressure are cooled per hour quickly to 30–40° C. and introduced into column 1; condensation of the water vapor causes the volume to be reduced to about 14 cubic meters. 150 liters of scrubbing liquid containing about 7–9 percent by weight ammonium carbonates, on the basis of ammonium bicarbonate, circulate at a temperature of about 20° C. in the scrubbing columns 1 and 2 recirculating about two to five times per hour. The ammonia is removed practically completely in column 1 and in addition not more than 20% of the water-soluble organic products (hydrocyanic acid and acrylonitrile) are retained in the scrubbing liquid. From the sump of column 1, the scrubbing liquid is pumped to the head of column 2, which is under a $CO_2$ pressure of from 0.02 to 0.1 excess atmospheres. From the sump of column 2, the carbon dioxide regenerated scrubbing liquid is reintroduced through a cooler and an expansion vessel 3, where the excess of dissolved carbon dioxide is removed, into the head of column 1. A partial branch flow of 8–9 kg./hour (that is to say, the quantity resulting from condensation of the reaction gas) is taken off and supplied to column 4.

In column 4, the acrylonitrile and hydrocyanic acid components are desorbed from the solution by a flow of inert gas at about 8 m.³/hour at 30–40° C., so that the sump discharge of this column is an aqueous solution of ammonium carbonates (7–9%) which is free of hydrocyanic acid and acrylonitrile, which is then further processed by methods known to the art. The flow of inert gas is freed from traces of ammonia in column 5, scrubbed with about 2 kg./hour fresh water (W) at 30° C., and combined finally with the ammonia-free flow of gas issuing from column 1. The combined gases pass into column 6 where they are scrubbed with water and freed from acrylonitrile and hydrocyanic acid which are subsequently recovered in pure form by distillation. Downstream of the scrubbing column 6 the gas required for the operation of columns 4 and 5 is removed.

By means of the process according to the invention, 97–99% of the acrylonitrile formed in the reactor from propylene and ammonia is recovered. The high yield shows that by the process according to the invention, a cyanoethylation of ammonia with acrylonitrile does not take place at all or only to a very limited extent.

We claim:
1. In a process for the production of acrylonitrile whereby propylene and ammonia are reacted in the gas phase with an oxidation catalyst at an elevated temperature to produce an effluent gas mixture consisting essentially of water vapor, acrylonitrile, hydrogen cyanide, ammonia and carbon dioxide, the improvement comprising the separation of the ammonia whereby chemical reactions in the effluent gas mixture between ammonia with acrylonitrile and hydrogen cyanide are substantially suppressed, by cooling the effluent mixture to a temperature between about 30 and 40° C., scrubbing the effluent mixture with an aqueous solution of a member selected from the group consisting of ammonium bicarbonate and a mixture of ammonium carbonate and ammonium bicarbonate, said aqueous solution being saturated with carbon dioxide and being maintained at a temperature below the decomposition temperature of carbon dioxide-ammonia compounds and the concentration of ammonium carbonates in said scrubbing solution being up to 20% by weight, calculated as ammonium bicarbonate, and subsequently recovering the absorbed ammonia and carbon dioxide from the said solution.

2. A process as defined in claim 1 in which said aqueous solution with which the effluent mixture is scrubbed is maintained at a temperature between 15 and 40° C.

3. A process as defined in claim 1 in which said aqueous solution with which the effluent mixture is scrubbed is maintained at a temperature between 15 and 25° C.

References Cited by the Examiner

UNITED STATES PATENTS

| 2,110,244 | 3/1938 | Schreiber | 23—3 X |
| 2,649,472 | 8/1953 | Lovett | 260—465.3 |
| 2,784,055 | 3/1957 | Silver | 23—196 X |

FOREIGN PATENTS

| 334,619 | 9/1930 | Great Britain. |
| 871,207 | 6/1961 | Great Britain. |

OTHER REFERENCES

Ephraim, "Inorganic Chemistry," Nordaman Publishing Co., Inc., New York, 4th ed., 1943, page 810.

CHARLES B. PARKER, *Primary Examiner.*

MAURICE A. BRINDISI, *Examiner.*

EARLE C. THOMAS, JOSEPH P. BRUST,
*Assistant Examiners.*